(12) United States Patent
Suzuki

(10) Patent No.: US 6,774,979 B2
(45) Date of Patent: Aug. 10, 2004

(54) LIGHT MIXING MEMBER AND IMAGE EXPOSING APPARATUS

(75) Inventor: Atsushi Suzuki, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/358,733

(22) Filed: Feb. 5, 2003

(65) Prior Publication Data

US 2004/0080731 A1 Apr. 29, 2004

(30) Foreign Application Priority Data

Feb. 12, 2002 (JP) ........................................ 2002-033879
Feb. 12, 2002 (JP) ........................................ 2002-033884

(51) Int. Cl.[7] ........................ G03B 27/54; G03B 27/72; G03B 21/14

(52) U.S. Cl. .............................. 355/37; 355/67; 355/71; 353/33; 359/638

(58) Field of Search .............................. 355/32, 37, 67, 355/71; 353/33; 359/638, 831; 348/338

(56) References Cited

U.S. PATENT DOCUMENTS 5,944,401 A * 8/1999 Murakami et al. ............ 353/33

* cited by examiner

*Primary Examiner*—Alan Mathews
(74) *Attorney, Agent, or Firm*—Frishauf, Holtz, Goodman & Chick, P.C.

(57) ABSTRACT

An image-exposing apparatus includes an optical device which mixes lights coming from different directions and emits a mixed light in a unilateral direction. The optical device includes first, second and third transparent members receiving first, second and third lights from first, second and third light-emitting element rows, respectively, a first composition plane, at which the first and second transparent members are joined and form a first light selective film, a second composition plane, at which the first and third transparent members are joined and form a second light selective film, and a wavelength controlling element which excludes a wavelength region of the first light from a region between a wavelength at which P-polarization changes from transmission to reflection in the first composition plane and another wavelength at which S-polarization changes from transmission to reflection in the first composition plane.

13 Claims, 9 Drawing Sheets

PRIOR ART

PRIOR ART

US 6,774,979 B2

LIGHT MIXING MEMBER AND IMAGE EXPOSING APPARATUS

TECHNICAL FIELD OF THE INVENTION

The present invention relates to an image exposure apparatus, and in particular, to an image exposure apparatus that exposes photosensitive materials by using rays of light each having a different wavelength emitted from a plurality of light-emitting elements.

BACKGROUND OF THE INVENTION

In recent years, there has been proposed to be put to practical use an image exposure apparatus that is equipped with array light sources each being composed of a plurality of light-emitting elements for each recording color. FIG. 9 is an illustration showing how exposure is carried out in the conventional image exposure apparatus. This image exposure apparatus is equipped with three array light sources 210, 220 and 230 each having substantially the same width as in photographic paper 100, for exposing the photographic paper 100 to light.

Each of these three array light sources 210, 220 and 230 emits light in accordance with each of R, G and B recording colors. When photographic paper 100 is conveyed in the direction of an arrow in the drawing, each of the array light sources 210, 220 and 230 was driven by staggering timing in accordance with the conveyance speed of the photographic paper 100 so that exposures for R, G and B may be conducted on the same position on the photographic paper 100.

When driving each of the array light sources 210, 220 and 230 by staggering the timing in accordance with the conveyance speed of the photographic paper 100, it is necessary to stagger the timing of driving signals to be supplied to each array light source in accordance with the conveyance speed. Therefore, there has been a problem that the structure of a driving circuit and control of the timing are complicated. Further, if the conveyance speed fails to be constant during the period from completion of exposure of a certain recording color to exposure of another color for the same pixel, there is caused a problem of out of color registration. For preventing the out of color registration, therefore, it was necessary to control strictly the conveyance speed for photographic paper 100.

To solve the problems stated above, there has been suggested a method to mix array-shaped emergent light emitted from each array light source, by using a light-mixing member such as dichroic prism 300 equipped with a light selective film that transmits or reflects light selectively depending on a wavelength. FIG. 10 is a schematic diagram showing how the dichroic prism 300 mixes light.

The dichroic prism 300 is composed of first transparent member 310, second transparent member 320 and third transparent member 330 which are made of optical glass. Between the first transparent member 310 and the second transparent member 320, there is provided first light selective film 340 that transmits or reflects selectively depending on a wavelength of light. In the same way, there is provided second light selective film 350 that transmits or reflects selectively depending on a wavelength of light, between the second transparent member 320 and the third transparent member 330.

When the dichroic prism 300 of this kind is used, linear emergent light emitted from array light source 210 is transmitted successively through the first transparent member 310, the first light selective film 340, the second transparent member 320, the second light selective film 350 and the third transparent member 330, and emerges. On the other hand, linear emergent light emitted from array light source 220 is transmitted through the second transparent member 320 and is reflected on the first light selective film 340, then, is transmitted successively through the second light selective film 350 and the third transparent member 330, and emerges. Further, linear emergent light emitted from array light source 230 is transmitted through the third transparent member 330 and is reflected on the second light selective film 350, to emerge. Through the paths mentioned above, each linear emergent light emitted from each of array light sources 210, 220 and 230 is tied up in a line.

An ordinary method to be employed for providing light selective films 340 and 350 on the dichroic prism 300 of this kind is one to deposit a metal such as aluminum or silver on a transparent member. However, each of transparent members 310, 320 and 330 constituting the dichroic prism 300 is a relatively long member matching with a line length of the array light source, and "a warp" is frequently caused in the longitudinal direction by heating in the course of deposition accordingly. When these transparent members each having "a warp" were jointed with each other, bubbles were generated between both transparent members or "a warp" was generated on the total product in some cases to deteriorate quality.

In the conventional dichroic prism 300, there was provided composition plane 360 having a relatively large area, as shown in FIG. 10, in addition to the composition plane forming the first light selective film 340 and the second light selective film 350, thus, an area of the total composition planes was great. When an area of the total composition planes is great, the possibility for both "warped" portions of the transparent members to come into contact with each other is great, thus, the problem of the quality deterioration has tended to happen.

Next, the first light selective film 340 and the second light selective film 350 both provided on the dichroic prism 300 have characteristics to transmit or reflect selectively depending on a wavelength of light as stated above. In general, when the light selective films have the characteristics of this kind, each of them needs to have a complicated layer structure having a certain extent of thickness.

However, each of the first light selective film 340 and the second light selective film 350 is provided at the portion sandwiched by the transparent members, and therefore, it is difficult for each of them to have the complicated layer structure having a sufficient thickness. For this reason, it is sometimes impossible to demonstrate sufficient transmission/reflection characteristics.

For example, when P polarized light and S polarized light are mixed in emergent light emitted from an array light source, a difference tends to be caused on a wavelength for the P polarized light in the case of switching from transmission to reflection and on a wavelength for the S polarized light in the case of switching from transmission to reflection, and if this difference is caused, the P polarized light and the S polarized light are averaged, and the intermediate state between transmission and reflection (half-transmitting and half-reflecting) is caused. As a result, efficiency of using light is sometimes lowered.

In this case, if a wavelength of P polarized light in the case of switching from transmission to reflection and a wavelength of S polarized light in the case of switching from transmission to reflection can be made to be close each other, it is possible to solve the aforesaid problem that efficiency of using light is lowered. However, for this purpose, the light selective film needs to be thick, and it has been difficult to construct a thick light selective film on the portion sandwiched by transparent members.

DISCLOSURE OF THE INVENTION

To overcome the abovementioned drawbacks, it is a first object of the present invention to provide a high-quality light-mixing part (hereinafter, also referred to as an optical device) having little warp in its longitudinal direction, and an image-exposing apparatus provided with the abovementioned light-mixing part and an image-exposing method employing the abovementioned light-mixing part.

Further, it is a second object of the present invention that, in an image-exposing apparatus which mixes a plurality of lights having wavelengths different relative to each other and emitted from a plurality of light-emitting elements to expose a photosensitive material, deterioration of the working efficiencies of these emitted lights are prevented, even in case that the polarizing surfaces of the lights, emitted from the light-emitting elements, do not coincide with each other in a unified direction.

Accordingly, to overcome the cited shortcomings, the abovementioned object of the present invention can be attained by optical devices, image-exposing apparatus and image-exposing methods described as follow.

(1) An optical device, which mixes a plurality of lights coming from directions being different relative to each other, so as to emit a mixed light in a unilateral direction, the optical device comprising: a first transparent member to receive a first light emitted from a first light-emitting element row; a second transparent member to receive a second light emitted from a second light-emitting element row; a third transparent member to receive a third light emitted from a third light-emitting element row; a first composition plane, at which the first transparent member and the second transparent member are jointed together and a first light selective film is formed, the first light and the third light penetrating through the first light selective film while the second light being reflected by the first light selective film toward a traveling direction same as that of the first light and the third light; a second composition plane, at which the first transparent member and the third transparent member are jointed together and a second light selective film is formed, the third light penetrating through the second light selective film while the first light being reflected by the second light selective film toward the traveling direction same as that of the third light; and a wavelength controlling element to exclude a wavelength region of the first light from a differential region between a wavelength at which a P-polarization changes from transmission to reflection in the first composition plane and another wavelength at which a S-polarization changes from transmission to reflection in the first composition plane.

(2) The optical device of item 1, wherein the wavelength controlling element is provided on the first transparent member in an exposed state, and is a third light selective film through which the first light penetrates in a wavelength selective manner.

(3) The optical device of item 1, wherein the first light is a blue light, the second light is a green light and the third light is a red light.

(4) An optical device, which mixes a plurality of lights coming from directions being different relative to each other, so as to emit a mixed light in a unilateral direction, the optical device comprising: a first transparent member, having an angular portion, to receive a first light emitted from a first light-emitting element row; a second transparent member to receive a second light emitted from a second light-emitting element row; a third transparent member to receive a third light emitted from a third light-emitting element row; a first composition plane, at which the first transparent member and the second transparent member are jointed together and a first light selective film is formed, the first light and the third light penetrating through the first light selective film while the second light being reflected by the first light selective film toward a traveling direction same as that of the first light and the third light; a second composition plane, at which the first transparent member and the third transparent member are jointed together and a second light selective film is formed, the third light penetrating through the second light selective film while the first light being reflected by the second light selective film toward the traveling direction same as that of the third light; and a third composition plane, which resides on an extended line of the first composition plane, and at which the second transparent member and the third transparent member are jointed together; wherein the angular portion of the first transparent member is fitted into a concave portion formed by the second composition plane and the third composition plane.

(5) The optical device of item 4, wherein a shape of the first transparent member is a lengthy pentagonal column, a top portion of which is an intersection of the first composition plane and the second composition plane, a shape of the second transparent member is a lengthy square column, in which the second composition plane and the third composition plane constitute a continuously-sloped surface, and a shape of the third transparent member is a lengthy triangle column having the angular portion, which is fitted into the concave portion formed by the second composition plane and the third composition plane.

(6) The optical device of item 4, wherein, when a total area of a side surface, including the third composition plane, of the third transparent member is defined as $S_1$, and an area of the third composition plane is defined as $S_2$, the following equation is established.

$$S_2 < (\tfrac{1}{2})S_1$$

(7) The optical device of item 4, wherein end portions of the second composition plane and the third composition plane are disposed outside an aperture angle region of a light-conversing element equipped in a direction of emitting the mixed light, the end portions being located at farther position with respect to the light-conversing element.

(8) An apparatus for exposing an image onto a photosensitive material, the apparatus comprising: a first light-emitting element row to emit a first light; a second light-emitting element row to emit a second light in a direction different from that of emitting the first light; a third light-emitting element row to emit a third light in a direction different from those of emitting the first light and the second light; an optical device to mix the first light, the second light and the third light, which come from directions being different relative to each other, so as to emit a mixed light in a unilateral direction, the mixed light being distributed on a line to expose the photosensitive material; and a moving device to move either the photosensitive material or the optical device in a direction substantially orthogonal to the line of the mixed light; wherein the optical device comprises: a first transparent member, having an angular portion, to receive the first light; a second transparent member to receive the second light; a third transparent member to receive the third light; a first composition plane, at which the first transparent member and the second transparent member are jointed together and a first light selective film is formed, the first light and the third light penetrating through the first light selective film while the second light being reflected by the first light selective film toward a traveling direction same as that of the first light and the third light; a second composition plane, at which the first transparent member and the third transparent member are jointed together and a second light selective film is formed, the third light penetrating through the second light selective film while the first light being reflected by the second light selective film toward the traveling direction same as that of the third light; and a third composition plane, which resides on an extended line of the first composition plane, and at which the second transparent member and the third transparent member are jointed together; wherein the angular portion of the first transparent member is fitted into a concave portion formed by the second composition plane and the third composition plane.

(9) The apparatus of item 8, wherein a shape of the first transparent member is a lengthy pentagonal column, a top portion of which is an intersection of the first composition plane and the second composition plane, a shape of the second transparent member is a lengthy square column, in which the second composition plane and the third composition plane constitute a continuously-sloped surface, and a shape of the third transparent member is a lengthy triangle column having the angular portion, which is fitted into the concave portion formed by the second composition plane and the third composition plane.

(10) The apparatus of item 8, wherein the first light is a blue light, the second light is a green light and the third light is a red light.

(11) A method for exposing an image onto a photosensitive material, the method comprising the steps of: emitting a first light, a second light and a third light, directions of which are different relative to each other, toward an optical device; mixing the first light, the second light and the third light, both entering the optical device, with each other in the optical device; exposing a mixed light onto the photosensitive material, the mixed light being distributed on a line; and moving either the photosensitive material or the optical device in a direction substantially orthogonal to the line of the mixed light; wherein the optical device comprises: a first transparent member, having an angular portion, to receive the first light; a second transparent member to receive the second light; a third transparent member to receive the third light; a first composition plane, at which the first transparent member and the second transparent member are jointed together and a first light selective film is formed, the first light and the third light penetrating through the first light selective film while the second light being reflected by the first light selective film toward a traveling direction same as that of the first light and the third light; a second composition plane, at which the first transparent member and the third transparent member are jointed together and a second light selective film is formed, the third light penetrating through the second light selective film while the first light being reflected by the second light selective film toward the traveling direction same as that of the third light; and a third composition plane, which resides on an extended line of the first composition plane, and at which the second transparent member and the third transparent member are jointed together; wherein the angular portion of the first transparent member is fitted into a concave portion formed by the second composition plane and the third composition plane.

(12) The optical device of item 4, wherein a non-polished surface is provided at a surface other than a light-receiving surface of the third transparent member which receives the third light and a surface which forms the second composition plane.

(13) The optical device of item 4, wherein a non-polished surface is provided at a surface other than a light-receiving surface of the first transparent member which receives the first light and a surface which forms the first composition plane.

(14) The optical device of item 4, wherein a non-polished surface is provided at a surface other than a light-receiving surface of the second transparent member which receives the second light and a surface which forms the second composition plane.

(15) An optical device, which is constituted by joining three transparent members with each other and mixes lights coming from three directions being different relative to each other, so as to emit a mixed light in a unilateral direction, the optical device comprising: light-entering surfaces each of which provided on each of the three transparent members and receives each of the lights coming from the three directions; and composition planes to transmit or reflect the lights coming from the three directions so as to emit the mixed light in the unilateral direction; wherein, in each of the three transparent members, a surface, other than each of the light-entering surfaces and each of the composition planes, is a non-polished surface.

(16) An apparatus for exposing an image onto a photosensitive material, the apparatus comprising: a first light-emitting element row to emit a first light; a second light-emitting element row to emit a second light in a direction being different from that of the first light; a third light-emitting element row to emit a third light in a direction being different from those of the first light and the second light; an optical device, which is constituted by joining three transparent members with each other and mixes the first light, the second light and the third light, those coming from directions being different relative to each other, so as to emit a mixed light in a unilateral direction, the mixed light being distributed on a line to expose the photosensitive material; and a moving device to move either the photosensitive material or the optical device in a direction substantially orthogonal to the line of the mixed light; wherein the optical device comprises: light-entering surfaces each of which provided on each of the three transparent members and receives each of the lights coming from the three directions; and composition planes to transmit or reflect the lights coming from the three directions so as to emit the mixed light in the unilateral direction; and wherein, in each of the three transparent members, a surface, other than each of the light-entering surfaces and each of the composition planes, is a non-polished surface.

Further, to overcome the abovementioned problems, other optical devices, image-exposing apparatus and image-exposing methods, embodied in the present invention, will be described as follow:

(17) A light-mixing part, characterized in that,
in the light-mixing part, which is structured by joining side surfaces of first, second and third transparent members, each shaped in a lengthy pentagonal column, to form a line-type emission light by mixing lights having wavelengths different relative to each other and emitted from first, second and third light-emitting elements, a first composition plane is formed by joining one side surface of the first transparent member and one side surface of the second transparent member together, and a concave portion, into which one angular portion of the third transparent member is fitted, is formed by another surface of the second composition plane and a part of said one side surface of the second composition plane, and a first light selective film, which selectively transmits or reflects the light corresponding to its wavelength, is formed on the first composition plane, and a second composition plane is formed by joining the other side surface of the first transparent member and one side surface of the second transparent member together in a state of fitting one angular portion of the third transparent member into the concave portion, and a second light selective film, which selectively transmits or reflects the light corresponding to its wavelength, is formed on the second composition plane, and a third composition plane is formed by joining one side surface of the second transparent member and a part of another side surface of the third transparent member together, and a first light emitted from the first light-emitting element, a second light emitted from the second light-emitting element and a third light emitted from the third light-emitting element are received by the first transparent member, the second transparent member and the third transparent member, respectively, and the second light selective film makes the third light transmitting through it toward the first transparent member side and makes the first light reflecting on it toward the direction same as that of the third light, and then, the first light selective film makes the first light and the third light transmitting through it to emit them toward the second transparent member and makes the second light reflecting on it toward the direction same as that of the first light and the third light.

(18) The light-mixing part, described in item 17, characterized in that, when a total area of the other side of the third transparent member is defined as $S_1$, and a partial area where the third composition plane is formed among the other side of the third transparent member is defined as $S_2$, the relationship of $$S_2 < (\tfrac{1}{2})S_1$$

is fulfilled.

(19) The light-mixing part, described in item 17 or item 18, characterized in that, when a light-conversing means is equipped in a direction of emitting the mixed light, end portions of the second composition plane and the third composition plane, which are located at farther positions in respect to the light-conversing means, are disposed outside an aperture angle region of the light-conversing element.

(20) An image-exposing apparatus, characterized in that, in the image-exposing apparatus, which exposes an image onto a photosensitive material by employing lights emitted from first, second and third light-emitting element rows, the light-mixing part, described anyone of items 1–3, which forms a line-type emission light by mixing lights having wavelengths different relative to each other and emitted from the first, second and third light-emitting elements, moving means for moving at least one of the photosensitive material and the light-mixing part, so that a exposed line, formed by exposing the line-type emission light onto the photosensitive material, is moved in a direction substantially orthogonal to the exposed line, are provided.

(21) An image-exposing method, characterized in that, in the image-exposing method for exposing an image onto a photosensitive material by employing lights emitted from first, second and third light-emitting element rows, a light-mixing process for forming a line-type emission light by mixing lights having wavelengths different relative to each other and emitted from the first, second and third light-emitting elements by means of the light-mixing part described anyone of items 1–3 a moving-exposure process for exposing the line-type emission light onto the photosensitive material, while moving at least one of the photosensitive material and the light-mixing part, so that a exposed line, formed by exposing the line-type emission light onto the photosensitive material, is moved in a direction substantially orthogonal to the exposed line, are provided.

(22) An image-exposing apparatus, characterized in that, in the image-exposing apparatus, which exposes an image onto a photosensitive material by employing first, second and third lights emitted from first, second and third light-emitting element rows, the light-mixing part, which forms a line-type emission light by mixing the first, second and third lights, and moving means for moving at least one of the photosensitive material and the light-mixing part, so that a exposed line, formed by exposing the line-type emission light onto the photosensitive material, is moved in a direction substantially orthogonal to the exposed line, are provided, and the light-mixing part is formed by joining the three transparent members, each of which receives each of the first, second and third lights, and each of the transparent members provided with a first composition plane and a second composition plane, on which first and second light selective films, for emitting the first, second and third lights in a unilateral direction by transmitting or reflecting each of them, are formed, and the first light selective film transmits the first light while reflects the second light in a direction same as that of the transmitted first light, and the second light selective film transmits the first light and the second light while reflects the third light in a direction same as that of the transmitted first and second lights, and wavelength controlling means, for excluding a wavelength region of said second light from a differential region between a wavelength at which a P-polarization changes from transmission to reflection in said second composition plane and another wavelength at which a S-polarization changes from transmission to reflection in said second composition plane, is provided.

(23) The image-exposing apparatus of item 22, characterized in that, the wavelength controlling means is a third light selective film, which is equipped on the surface of the second transparent member in an exposed state and from which the second light, emitted from the second light-emitting element row, enters.

EMBODIMENT IN BEST MODE FOR IMPLEMENTING THE INVENTION

Figure 1:
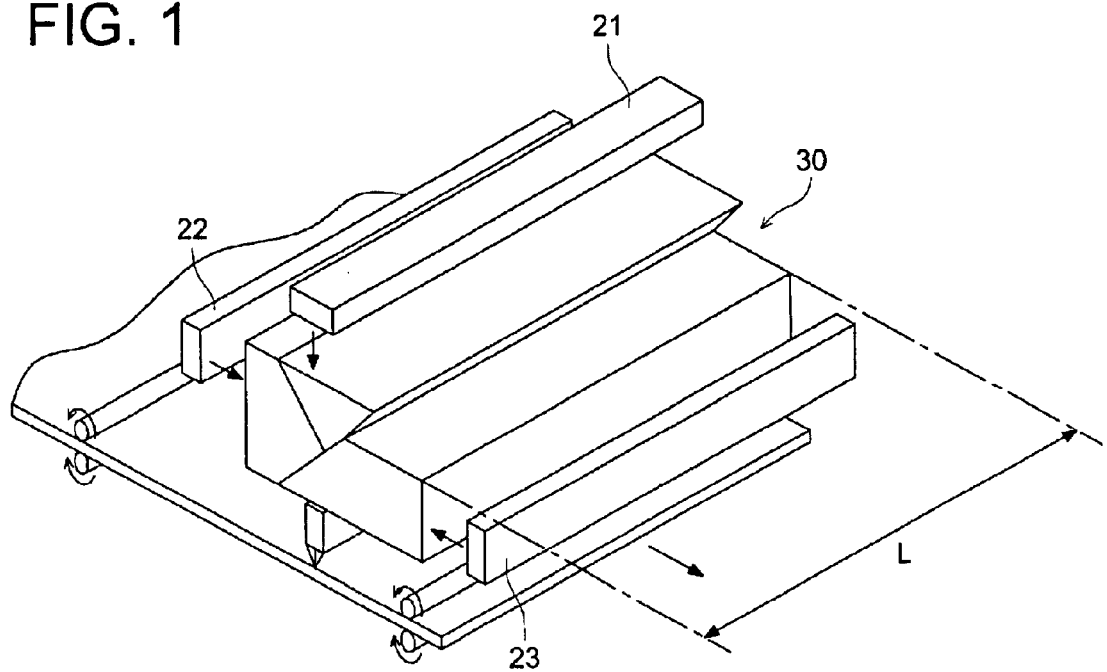
FIG. 1 is a schematic perspective view showing the structure of the main portions of an image exposure apparatus relating to an embodiment of the invention.

An embodiment of the invention will be explained in detail as follows, referring to the drawings. In the present embodiment, an image exposure apparatus for conducting prescribed exposure on a photosensitive material will be explained.

First, the total structure of an image exposure apparatus relating to the present embodiment of the invention will be explained, referring to FIG. 1–FIG. 3. In this case, FIG. 1 is a schematic perspective view showing the structure of the main portions of an image exposure apparatus relating to an embodiment of the invention, FIG. 2 is a schematic side view showing the total structure of an image exposure apparatus relating to an embodiment of the invention, and FIG. 3 is a schematic side view showing the structure of the main portions of an image exposure apparatus relating to the first embodiment.

Figure 2:
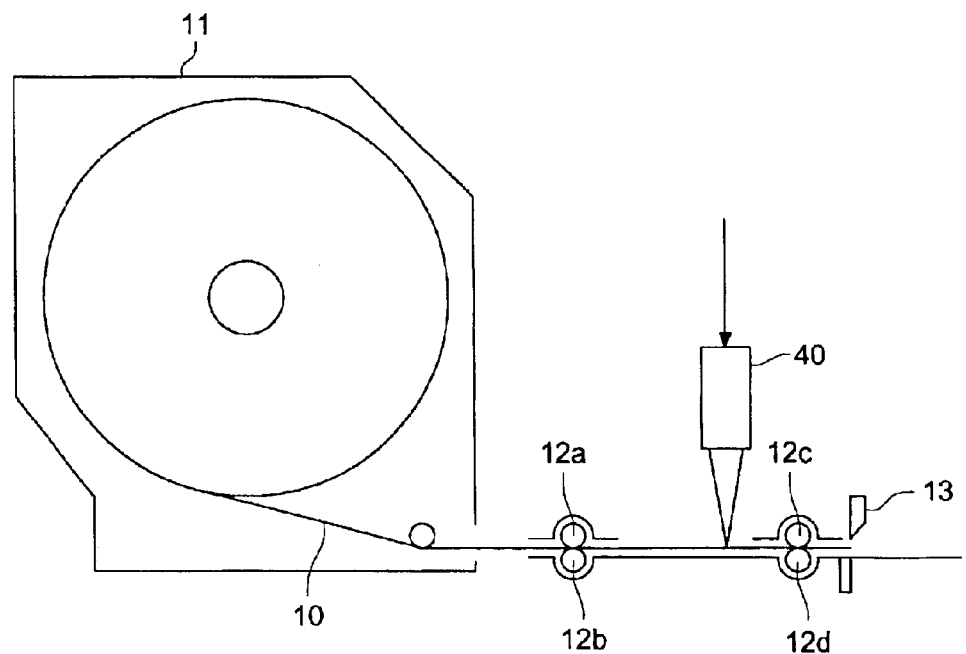
FIG. 2 is a schematic side view showing the total structure of an image exposure apparatus relating to an embodiment of the invention.
Figure 3:
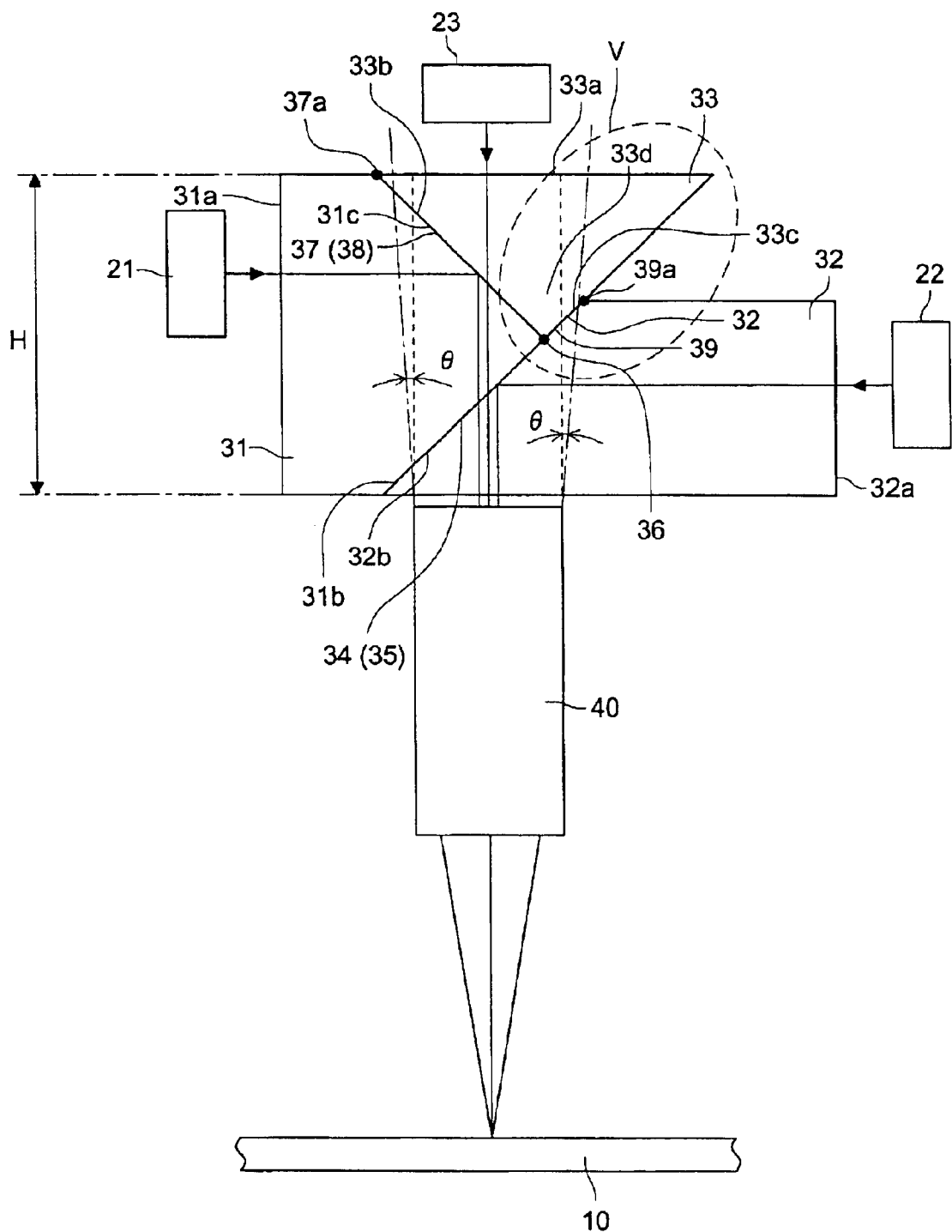
FIG. 3 is a sectional view showing the concrete structure of a dichroic prism of an image exposure apparatus relating to the first embodiment of the invention.

An image exposure apparatus relating to the present embodiment is equipped with paper magazine 11 that holds photographic paper 10 wound in a roll shape, driving rollers 12a, 12b, 12c and 12d which convey the photographic paper 10 at the prescribed conveyance speed, and cutter 13 that cuts the exposed photographic paper 10 in a prescribed size, as shown in FIG. 1 and FIG. 2. The photographic paper 10 is a photosensitive material.

As shown in FIG. 1 and FIG. 2, an image exposure apparatus relating to the present embodiment is equipped with first array light source 21 composed of array-shaped light-emitting element for conducting exposure for first light (blue), second array light source 22 composed of array-shaped light-emitting element for conducting exposure for second light (green) and third array light source 23 composed of array-shaped light-emitting element for conducting exposure for third light (red).

A wavelength area for the first light (blue) emitted from the first array light source 21 is established to be within a range of 420–470 nm. Then, a wavelength area for the second light (green) emitted from the second array light source 22 is established to be within a range of 530–580 nm. A wavelength area for the third light (red) emitted from the third array light source 23 is established to be within a range of 640–680 nm.

In this case, the array light source means a light-emitting element row wherein light-emitting can be controlled independently on the portion corresponding to each pixel. In the present embodiment, a light-emitting element row that is composed of plural light-emitting elements (LED or the like) which can be controlled in terms of light-emitting independently for each pixel is employed as an array light source.

Incidentally, photographic paper 10 representing a photosensitive material is made to be sensitive highly to the light having a short wavelength. To be concrete, when compared with sensitivity to the first light (blue) having the shortest wavelength, sensitivity to the second light (green) is one tenth thereof, while, sensitivity to the third light (red) having the longest wavelength is one-hundredth thereof. Therefore, an amount of the third light (red) emitted from the third array light source 23 is established to be the greatest.

Further, an image exposure apparatus relating to the present embodiment is equipped with dichroic prism (light-mixing means) 30 that mixes a light flux emitted from an array light source for each recording color, and makes a light flux for each recording color to emerge through the same path and with selfoc lens array (light-converging means) 40 that converges a light flux of each recording color mixed by the dichroic prism 30 on a photosensitive material for exposure.

The dichroic prism 30 is equipped with first transparent member 31 representing a lengthy pentagonal column, second transparent member 32 representing a lengthy square column and third transparent column 33 representing a lengthy triangle column, and it is constructed when each lengthy side of each transparent member is jointed with that of another transparent member.

As a material for each transparent member, there is given borosilicate glass having excellent transmittance for a ray of light having a wavelength in a visible area. In the present embodiment, "BK 7" (which is a name of product made by Shot Glass Co.) is used as a material for the first transparent member 31, the second transparent member 32 and the third transparent member 33.

In the present embodiment, a length of dichroic prism 30 (L in FIG. 1) is set to about 100 mm so that it may be equal to a length of each array light source. Further, a height (H in FIG. 3) of the dichroic prism is set to about 15 mm for the purpose of enhancing light-converging efficiency. Namely, the dichroic prism 30 is made totally to be a long and slender columnar object.

(First Embodiment)

An image exposure apparatus relating to the first embodiment in the invention will be explained, referring to FIG. 3.

The first transparent member 31 is equipped with plane of incidence 31a that has an average transmittance of 95% or more for the first light (blue) having a wavelength of 420–450 nm. The second transparent member 32 is equipped with plane of incidence 32a that has an average transmittance of 97% or more for the second light (green) having a wavelength of 530–600 nm.

The third transparent member 33 is equipped with plane of incidence 33a that has an average transmittance of 90% or more for the third light (red) having a wavelength of 640–680 nm.

On each of planes of incidence 31a, 32a and 33a, there is provided a prescribed metal film through deposition so that the average transmittance mentioned above may be secured.

Side 31b of the first transparent member 31 and side 32b of the second transparent member 32 are jointed to form first composition plane 34.

On the first composition plane 34, there is provided first light selective film 35 that transmits or reflects light selectively depending on a wavelength. This first light selective film 35 functions to transmit the first light (blue) and the third light (red) and to reflect the second light (green). Namely, there is provided a prescribed metal film that makes average transmittance for the first light (blue) having a wavelength of 420–470 nm, average transmittance for the third light (red) having a wavelength of 640–680 nm, and average transmittance for the second light (green) having a wavelength of 530–560 nm, to be respectively 75% or more, 95% or more and 10% or less.

Further, concave portion 36 in which corner portion 33d of the third transparent member 33 is to be fit in is formed by other side 31c of the first transparent member 31 and by a part of side 32b of the second transparent member 32. Under the condition that the corner portion 33d of the third transparent member 33 is fit in the concave portion 36, other side 31c of the first transparent member 31 and side 33b of the third transparent member 33 are jointed each other to form the second composition plane 37.

On the second composition plane 37, there is provided second light selective film 38 that transmits or reflects light selectively depending on a wavelength. This second light selective film 38 functions to reflect the first light (blue) and to transmits the third light (red). Namely, the prescribed metal film whose average transmittance for the first light (blue) having a wavelength of 450–470 nm is 10% or less and average transmittance for the third light (red) having a wavelength of 610–680 nm is 95% or more is provided in the method of deposition.

Figure 4:
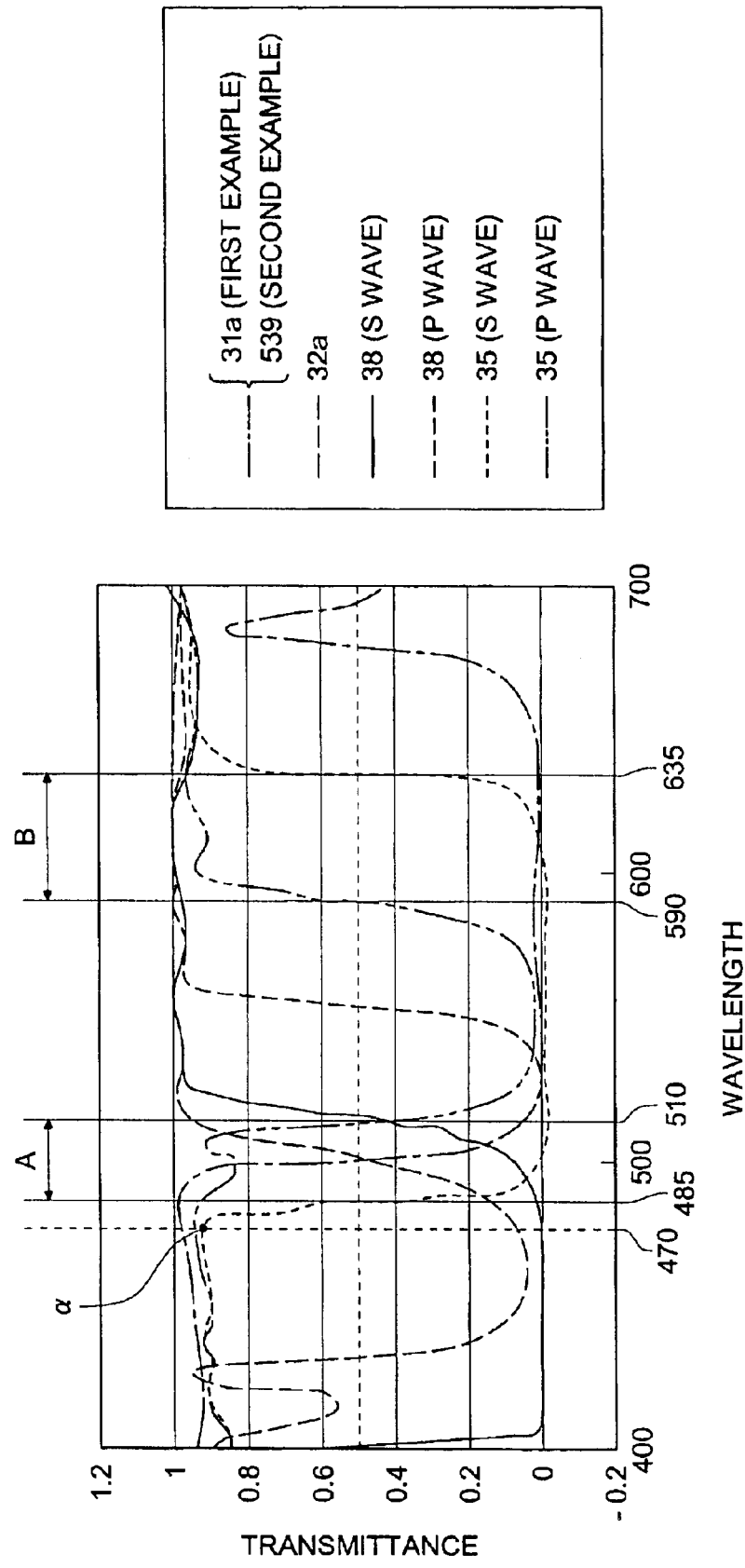
FIG. 4 is a diagram of characteristics showing characteristics of the third light selective film (wavelength control means), the first light selective film and the second light selective film for a dichroic prism of an image exposure apparatus relating to an embodiment of the invention.

FIG. 4 is a diagram of characteristics showing characteristics (transmittance of light) of light-entering surface 31a of the first transparent member 31, light-entering surface 32a of the second transparent member 32, first light selective film 35 (P wave and S wave) and second light selective film 38 (P wave and S wave). In FIG. 4, six types of graphs showing characteristics (transmittance of light) for the light-entering surface 31a, light-entering surface 32a, first light selective film 35 (P wave and S wave) and second light selective film 38 (P wave and S wave) are given the same numbers respectively.

As shown in FIG. 4, the light-entering surface 31a of the first transparent member 31 has an excellent (95% or more) average transmittance for the first light (blue) having a wavelength of 420–450 nm. The light-entering surface 32a of the second transparent member 32 has an excellent (97% or more) average transmittance for the second light (green) having a wavelength of 530–600 nm.

Further, as shown in FIG. 4, it is found that the average transmittance of the first light selective film 35 for the third light (red) having a wavelength of 640–680 nm is equally excellent (95% or more) regardless of whether a plane of polarization of the third light (red) is of S wave or P wave and that the average transmittance of the first light selective film 35 for the first light (blue) having a wavelength of 420–470 nm is relatively excellent (75% or more) equally, regardless of whether a plane of polarization of the first light (blue) is of S wave or P wave. On the other hand, the average transmittance for the second light (green) having a wavelength of 530–560 nm is made to be 10% or less regardless of whether the plane of polarization of the second light (green) is of S wave or P wave, which clarifies that the second light (green) can be reflected effectively.

Further, as shown in FIG. 4, it is found that the average transmittance of the second light selective film 38 for the third light (red) having a wavelength of 610–680 nm is excellent (95% or more) regardless of whether a plane of polarization of the third light (red) is of S wave or P wave. On the other hand, the average transmittance of the second light selective film 38 for the first light (blue) having a wavelength of 450–470 nm is made to be 10% or less regardless of whether the plane of polarization of the first light (blue) is of S wave or P wave, which clarifies that the first light (blue) can be reflected effectively.

Namely, even when planes of polarization for lights emitted from array light sources are not made uniform, allowing P wave and S wave to be mixed, any of the first light (blue), the second light (green) and the third light (red) can be transmitted properly through light-entering surfaces 31a–33a. Further, even when planes of polarization for lights emitted from array light sources are not made uniform, allowing P wave and S wave to be mixed, the second light selective film 38 can transmit the third light (red) properly and can reflect the first light (blue) properly. Further, even when planes of polarization for lights emitted from array light sources are not made uniform, allowing P wave and S wave to be mixed, the first light selective film 35 can transmit the first light (blue) and the third light (red) effectively and can reflect the second light (green) properly.

Under the condition that the corner portion 33d of the third transparent member 33 is fit in the concave portion 36, a part of side 32b of the second transparent member 32 and a part of other side 33c of the third transparent member 33 are jointed each other to form the third composition plane 39. On this third composition plane 39, there is provided no light selective film.

Figure 5:
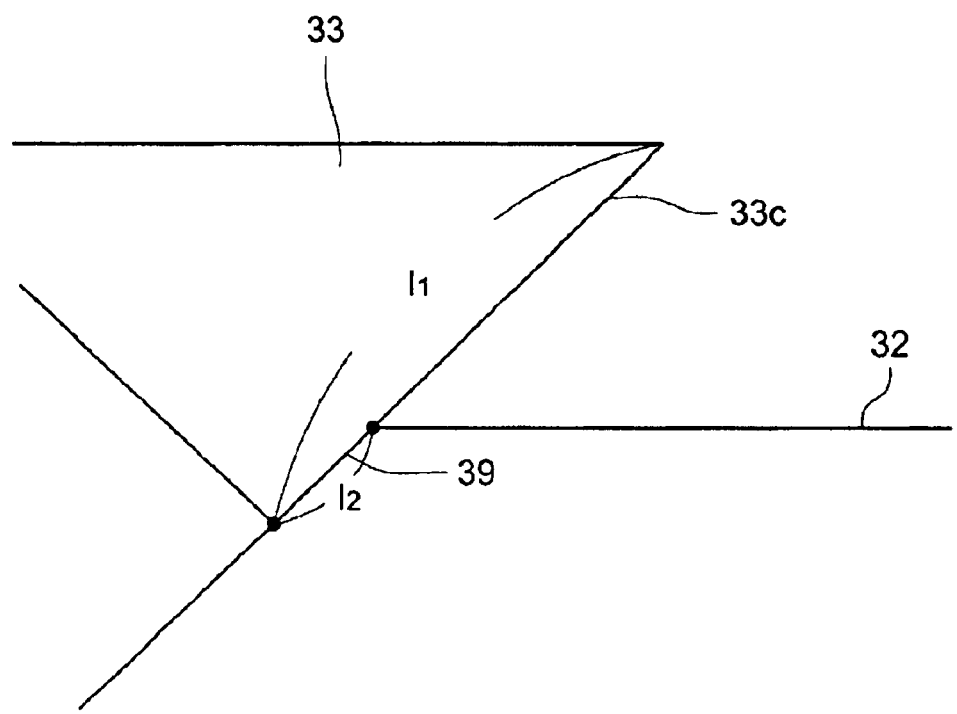
FIG. 5 is an enlarged diagram of portion v in FIG. 3.

FIG. 5 is an enlarged diagram of portion v in FIG. 3. In the present embodiment, $l_1$ and $l_2$ are established to satisfy the relationship of $$l_2 < (\tfrac{1}{2}) l_1$$

when $l_1$ represents a width of other side 33c of the third transparent member 33 and $l_2$ represents a width of the portion within the other side 33c of the third transparent member 33 where the third composition plane 39 is formed. Therefore, area $S_2$ ($=l_2 L$) of the portion within the other side 33c of the third transparent member 33 where the third composition plane 39 is formed is made to be less than ½ of total area $S_1$ ($=l_1 L$) of the other side 33c of the third transparent member 33. Namely, $S_1$ and $S_2$ satisfy the following relationship.

$$S_2 < (\tfrac{1}{2}) S_1$$

When jointing sides of respective transparent members as stated above, it is possible to use adhesive agents. As a type of the adhesive agent, acrylic resin (acrylic UV curing resin, in particular) can be given.

Incidentally, when providing the first light selective film 35, a prescribed metal film is provided first on side 31b of the first transparent member 31 or on side 32b of the second transparent member 32 through deposition. Then, the side 31b of the first transparent member 31 and the side 32b of the second transparent member 32 are jointed to each other by adhesive agents.

Further, when providing the second light selective film 38, a prescribed metal film is provided first on the other side 31c of the first transparent member 31 or on side 33b of the third transparent member 33 through deposition. Then, the other side 31c of the first transparent member 31 and the side 33b of the third transparent member 33 are jointed to each other by adhesive agents.

Next, light-mixing procedures employing the dichroic prism 30 constructed as stated above will be explained.

First, the first light (blue) emitted from the first array light source 21 is received by the first transparent member 31, the second light (green) emitted from the second array light source 22 is received by the second transparent member 32 and the third light (red) emitted from the second array light source 23 is received by the third transparent member 33. Then, the third light (red) is transmitted by the second light selective film 38 to the first transparent member 31 side, and the first light (blue) is reflected by the second light selective film 38 in the same direction as that of the third light (red) transmitted through the second light selective film 38. Then, the first light (blue) and the third light (red) are transmitted by the first light selective film 35 to the second transparent member 32 side to emerge, and the second light (green) is reflected to emerge by the first light selective film 35 in the same direction as that of the first light (blue) and the third light (red) transmitted by the first light selective film 35 to emerge. Thus, light-mixing can be conducted by the aforementioned procedures.

Further, emerging light that is light-mixed by dichroic prism 30 is converged by selfoc lens array 40 representing a light-converging means on photographic paper 10 for exposure, as shown in FIG. 1 and FIG. 2.

Positional relationship between the selfoc lens array 40 and the dichroic prism 30 will be explained.

In the present embodiment, end portion 37a on the upper side (farther from the selfoc lens array 40) of the second composition plane 37 of the dichroic prism 30 and end portion 39a on the upper side (farther from the selfoc lens array 40) of the third composition plane 39 are arranged to be out of the range of angular aperture θ of the selfoc lens array 40.

By arranging the end portion 37a of the second composition plane 37 and the end portion 39a of the third composition plane 39 in the aforesaid manner, it is possible to prevent that scattered light that is generated when the first light (blue) is reflected by the second light selective film 38 and scattered light that is generated when the second light (green) is reflected by the first light selective film 35 enter the selfoc lens array 40. Therefore, images of higher quality can be obtained.

Figure 6:
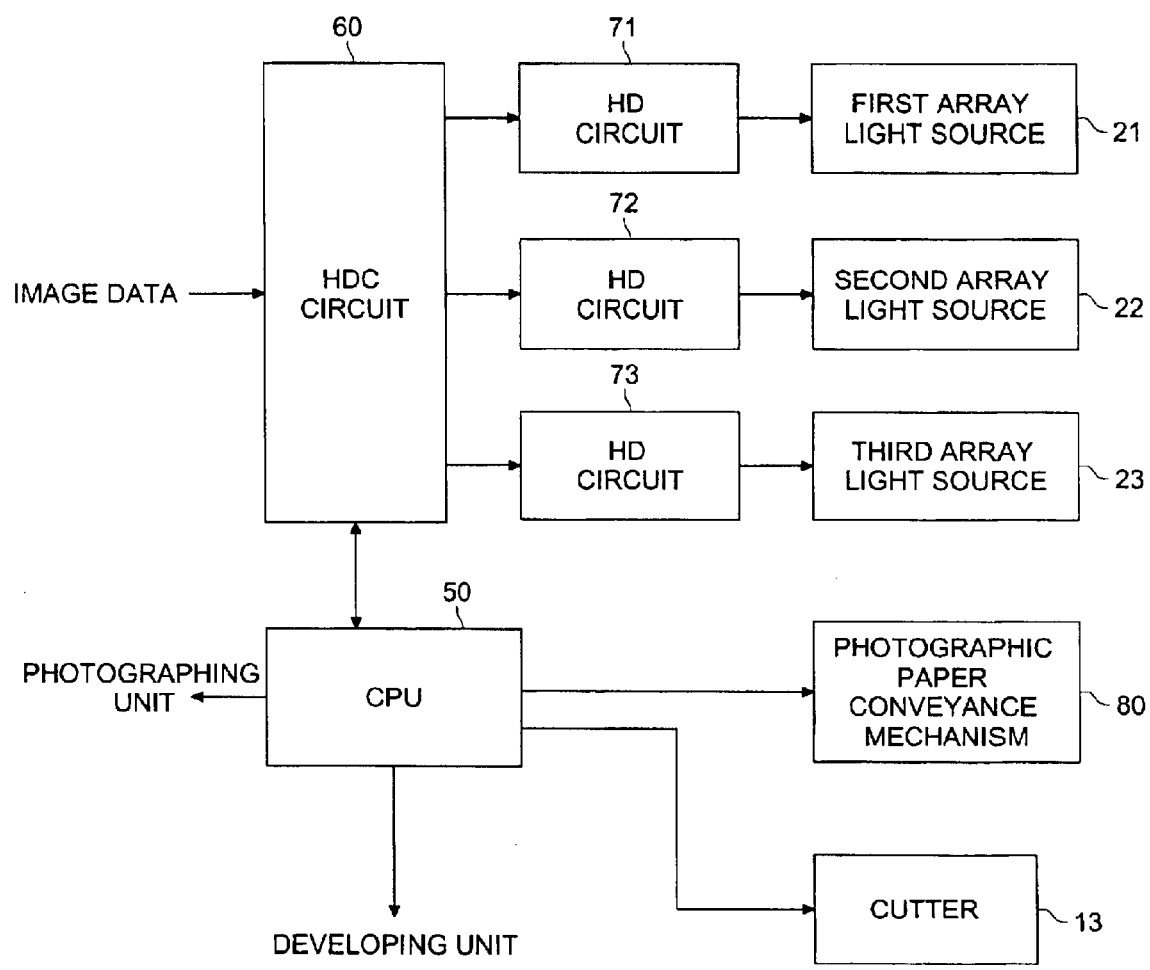
FIG. 6 is an illustration showing the electric structure of the total image exposure apparatus relating to an embodiment of the invention.

FIG. 6 is an illustration showing the electric structure of the image exposure apparatus relating to the first embodiment. Incidentally, in FIG. 6, the same structures as those in FIG. 1–FIG. 3 which have already been explained are given the same numbers.

As shown in FIG. 6, the image exposure apparatus of the present embodiment is equipped with CPU 50 representing a control means that controls each section, head driver control circuit (HDC circuit) 60 that receives image data from the outside and generates an image signal for driving an array light source for each color, head driver circuit (HD circuit) 71 that receives an image signal for the first color from HDC circuit 31 and generates a light-emitting signal that makes a light-emitting element of the first array light source 21 to emit light in accordance with gradation, head driver circuit (HD circuit) 72 that receives an image signal for the second color from HDC circuit 32 and generates a light-emitting signal that makes a light-emitting element of the second array light source 22 to emit light in accordance with gradation, head driver circuit (HD circuit) 73 that receives an image signal for the third color from HDC circuit 33 and generates a light-emitting signal that makes a light-emitting element of the third array light source 23 to emit light in accordance with gradation, and with photographic paper conveyance mechanism 80 that is composed of a driving motor and driving rollers 12a, 12b, 12c and 12d.

Now, operations of the image exposure apparatus relating to the first embodiment structured as shown in FIG. 6 will be explained.

First, CPU 50 makes the photographic paper conveyance mechanism 80 to feed out photographic paper 10 at the prescribed speed. Then, image data of colors coming from the outer cameras and image processing circuits are separated into an image signal for each color in the HDC circuit 60. In this case, the timing of light emission has been staggered for each color depending on an arrangement of an array light source and on the conveyance speed for photographic paper 10, in the past. However, it is not necessary to stagger the timing in the first embodiment.

Namely, image signals for respective colors may be supplied to HD circuits 71–73 in the same timing. For example, the HDC circuit 60 conducts color separation into B, G and R, and supplies B image signal, G image signal and R image signal respectively to HD circuit 71, HD circuit 72 and HD circuit 73.

HD circuits 71–73 which have received image signals for respective colors at the same timing from HDC circuit 60 generate, in accordance with gradation of image signals, light-emitting signals for making light-emitting elements of array light sources to emit light. Then, the first array light source 21—the third array light source 23 which have received the light-emitting signals respectively from HD circuits 71–73 emit light at the same timing, in accordance with image signals for respective colors.

Rays of light emitted simultaneously from these first array light source 21—the third array light source 23 enter dichroic prism 30 from plural entering ends. Then, incident rays of light for plural colors are mixed by transmission and reflection of light on the first light selective film 35 and the second light selective film 38 of dichroic prism 30, and are outputted from one emerging end as emerging light.

Namely, in the past, there have been required timing adjustment which is needed because respective array light sources are in plural rows, timing adjustment for arrangement of respective colors of B, G and R and a mechanism to control movement in the direction perpendicular to the conveyance direction in the conveyance plane for conducting exposure for each color. In the present embodiment, however, they are not required.

Thus, light fluxes coming from array light sources for respective recording colors are tied up in a bundle to be used for exposure as one line. It is therefore possible to realize an image exposure apparatus wherein light-mixing is conducted by a prism without a loss of an amount of light, a driving circuit can be structured easily and the timing can be controlled easily, and no color doubling is caused even when the conveyance speed becomes uneven. Namely, it is possible to make each of light fluxes from respective array light sources to agree with others on photographic paper 10, even for the highly divergent light flux which is different from a light beam such as a laser beam which travels for a long distance without being diverged.

Photographic paper 10 which has been completed in terms of exposure based on image data is cut by cutter 13 to the prescribed size, and is developed by an unillustrated developing unit.

On dichroic prism 30 provided on the image exposure apparatus of the present embodiment, a part of side 32b of the second transparent member 32 and a part of other side 33c of the third transparent member 33 are jointed to form the third composition plane 39 whose area is smaller than that of the conventional composition plane.

To be concrete, an area ($S_2$) of the portion in other side 33c of the third transparent member 33 where the third composition plane 39 is formed is made to be less than ½ of total area ($S_1$) of other side 33c of the third transparent member 33, and an area of the third composition plane 39 representing the composition plane other than the composition plane (the first composition plane 34 and the second composition plane 37) where a light selective film is provided is made to be relatively small. Therefore, an area of the total composition plane is made to be small, and the rate of contact for both "warped" portions of the transparent members is reduced, thus, high quality of products is brought about.

Further, concave portion 36 in which corner portion 33d of the third transparent member 33 is fit is formed on the dichroic prism 30 provided on the image exposure apparatus in the present embodiment, by other side 31c of the first transparent member 31 and by a part of side 32b of the second transparent member 32. Under the condition that the corner portion 33d of the third transparent member 33 is fit in the concave portion 36, other side 31c of the first transparent member 31 and side 33b of the third transparent member 33 are jointed each other to form the second composition plane 37. Further, a part of side 32b of the second transparent member 32 and a part of other side 33c of the third transparent member 33 are jointed to form the third composition plane 39. Therefore, light-mixing parts can be manufactured extremely easily.

On the dichroic prism 30 provided on the image exposure apparatus of the present embodiment, end portion 37a on the upper side (farther from the selfoc lens array 40) of the second composition plane 37 and end portion 39a on the upper side (farther from the selfoc lens array 40) of the third composition plane 39 are arranged to be out of the range of angular aperture of the selfoc lens array 40. Therefore, it is possible to prevent that scattered light that is generated when the first light (blue) is reflected by the second light selective film 38 and scattered light that is generated when the second light (green) is reflected by the first light selective film 35 enter the selfoc lens array 40. Therefore, images of higher quality can be obtained.

Figure 8:
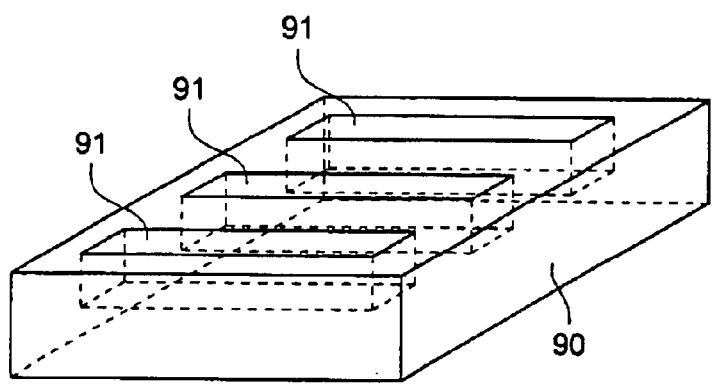
FIG. 8 is a schematic perspective view of the case that is used when transporting or storing a dichroic prism of an image exposure apparatus relating to an embodiment of the invention.
Figure 9:
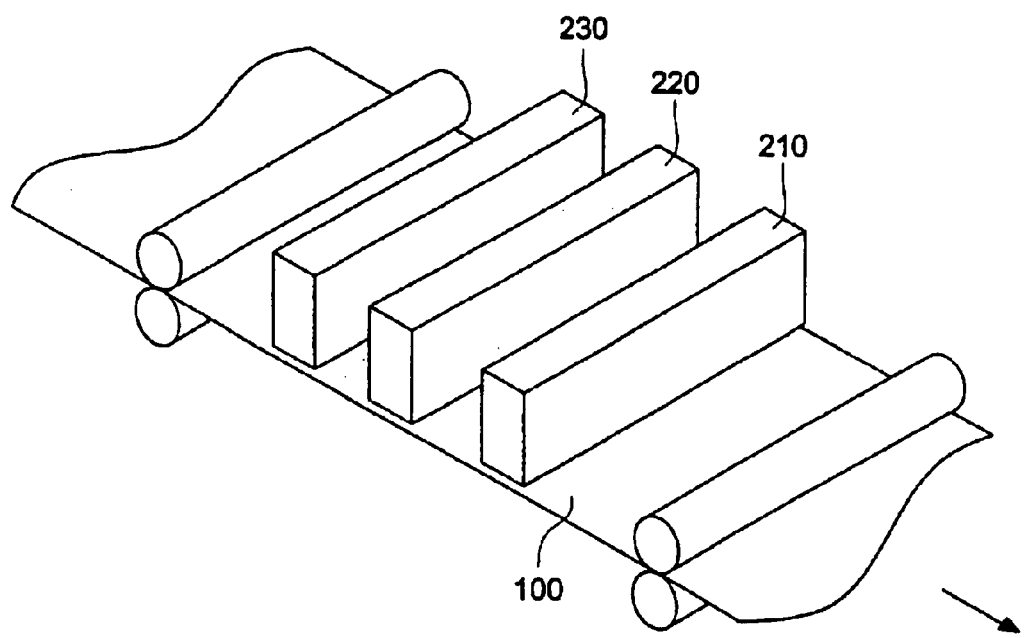
FIG. 9 is an illustration showing how an image is formed on the conventional image exposure apparatus.
Figure 10:
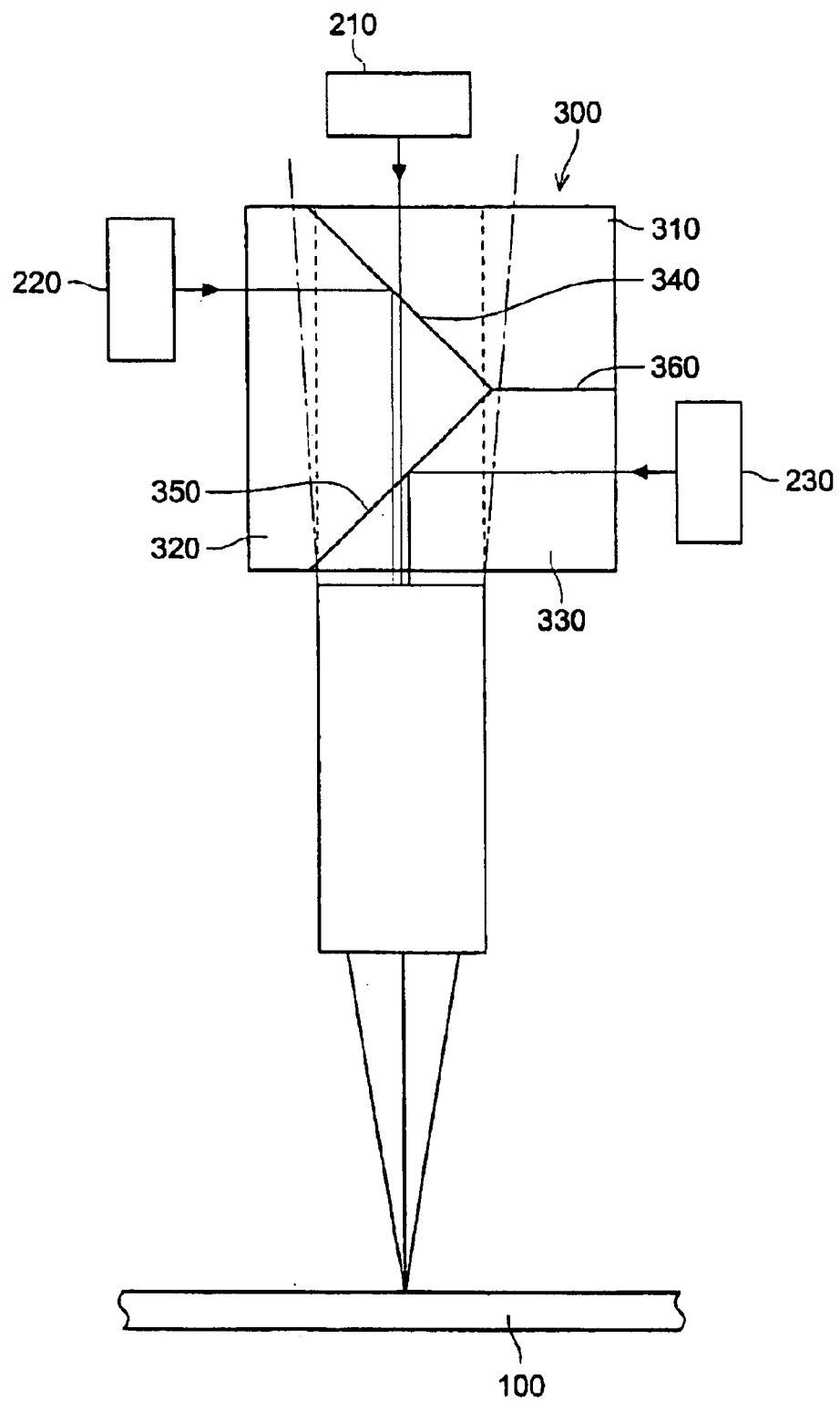
FIG. 10 is an illustration showing how light mixing is conducted by the conventional dichroic prism.

Incidentally, when transporting or storing the dichroic prism 30 provided on the image exposure apparatus in the present embodiment, it is possible to use case 90 made of foam polystyrene shown in FIG. 8. On the top face of the case 90, there is formed concave portion 91 that is fitted in terms of a shape to dichroic prism 30. The dichroic prism 30 can be fitted in the concave portion 91 after being wrapped with paper so that the total case 90 may be packed in a cardboard box to be transported or stored.

(Second Embodiment)

Figure 7:
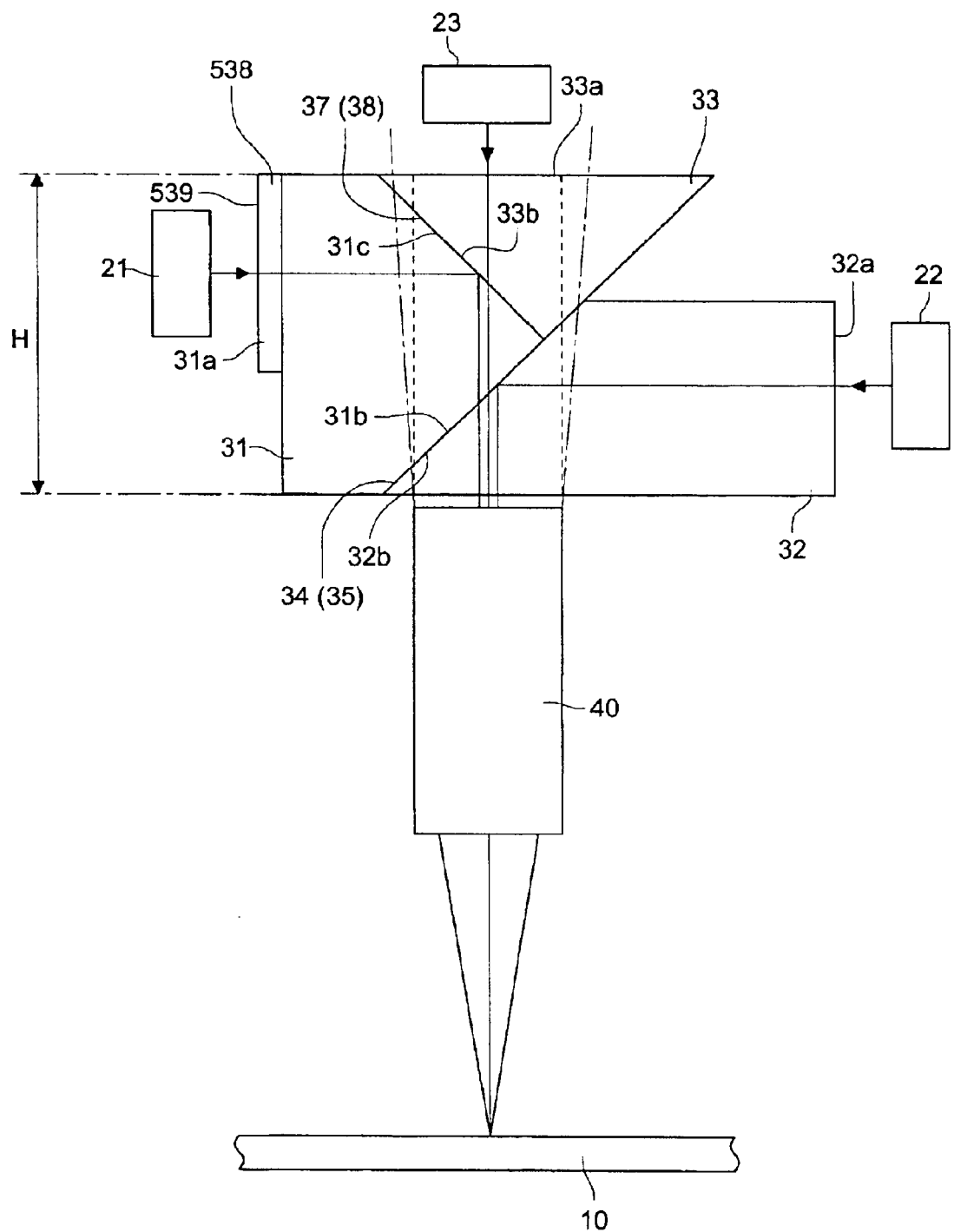
FIG. 7 is a sectional view showing the concrete structure of a dichroic prism of an image exposure apparatus relating to the second embodiment of the invention.

Next, an image exposure apparatus relating to the second embodiment of the invention will be explained, referring to FIG. 7. Incidentally, in the following explanation, components and constituents which are the same as those in the first embodiment are given the same numbers, and overlapped explanation will be omitted.

The first transparent member 31 is equipped with plane of incidence 31a where the first light (blue) enters. The third transparent member 33 is equipped with plane of incidence 33a where the third light (red) enters. On the other hand, on the plane of incidence 32a of the second transparent member 32 where the second light (green) enters, there is jointed sheet-formed glass member 538. On the plane of incidence of the sheet-formed glass member 538 for the first light (blue), there is provided the third light selective film 539 having transmittance of 90% or more for the area of a wavelength of 420–450 nm in the first light (blue).

A ray of light in the area having a wavelength of 420–450 nm in the first light (blue) emitted from the first array light source 21 is made by the third light selective film 539 to enter the first transparent member 31. This third light selective film 539 is a wavelength control means which will be described later. Incidentally, the plane of incidence 31a of the first transparent member 31 is made to be a non-polished surface because it is a composition plane where the sheet-formed glass member 538 is jointed.

Side 33b of the third transparent member 33 and side 31c of the first transparent member 31 are jointed each other to form the second composition plane 37. On this second composition plane 37, there is provided second light selective film 38 that transmits or reflects light selectively depending on a wavelength. This second light selective film 38 functions to transmit the third light (red) and to reflect the first light (blue). The second light selective film 38 is provided through deposition of a prescribed metal film.

Further, other side 31b of the first transparent member 31 and side 32b of the second transparent member 32 are jointed each other to form the first composition plane 34. On this first composition plane 34, there is provided first light selective film 35 that transmits or reflects light selectively depending on a wavelength. This first light selective film 35 functions to transmit the third light (red) and the first light (blue) and to reflect the second light (green). The first light selective film 35 is provided through deposition of a prescribed metal film.

FIG. 4 is a diagram of characteristics showing characteristics (transmittance of light) owned by the third light selective film 539 provided on the sheet-formed glass member 538 jointed with the first transparent member 31, plane of incidence 32a of the second transparent member 32, the second light selective film 38 and the first light selective film 35. In FIG. 4, six types of graphs showing transmittance of light for each of the third light selective film 539, the plane of incidence 32a, the second light selective film 38 (P polarized light and S polarized light) and the first light selective film 35 (P polarized light and S polarized light) are given the respective symbols.

As is shown in FIG. 4, the third light selective film 539 has excellent transmittance for the first light (blue). Further, the plane of incidence 32a has excellent transmittance for the second light (green).

Further, as is shown in FIG. 4, the second light selective film 38 has high transmittance for both S polarized light and P polarized light of the third light (red) (having a wavelength of 640–680 nm). On the other hand, the transmittance of the second light selective film 38 is established to be low for both S polarized light and P polarized light of the first light (blue) (having a wavelength of 420–450 nm). Namely, the second light selective film 38 has high reflectance for both S polarized light and P polarized light of the first light (blue) (having a wavelength of 420–450 nm).

Further, as is shown in FIG. 4, the first light selective film 35 has high transmittance for both S polarized light and P polarized light of the third light (red) (having a wavelength of 640–680 nm). It further has high transmittance for both S polarized light and P polarized light of the first light (blue) (having a wavelength of 420–450 nm). On the other hand, the transmittance of the first light selective film 35 is established to be low for both S polarized light and P polarized light of the second light (green) (having a wavelength of 530–580 nm). Namely, the first light selective film 35 has high reflectance for both S polarized light and P polarized light of the second light (green) (having a wavelength of 530–580 nm).

Namely, even when a plane of polarization of the first light (blue) emitted from the first array light source 21 is not uniform, and P polarized light and S polarized light are mixed, the second light selective film 32 can reflect the first light (blue) satisfactorily. Further, even when a plane of polarization of the second light (green) emitted from the second array light source 22 is not uniform, and P polarized light and S polarized light are mixed, the first light selective film 35 can reflect the second light (green) satisfactorily.

In the present embodiment, there is a difference between a wavelength (about 510 nm) in the case of switching of P polarized light from transmission to reflection by the first light selective film 35 and a wavelength (about 485 nm) in the case of switching of S polarized light from transmission to reflection by the first light selective film 35, as shown in FIG. 4. Let it be assumed that this difference area of the wavelengths (about 485 nm–about 510 nm in wavelength) is called "first difference area A" hereafter. In this case, the wavelength in the case of switching of P polarized light (S polarized light) from transmission to reflection by the first light selective film 35 means a wavelength at a point in time when the transmittance of the first light selective film 35 reaches 50% after going down slowly from 100%.

On the image exposure apparatus of the present embodiment, there is provided a wavelength control means that controls so that the wavelength area of the first light may not be included in the first difference area A.

This wavelength control means is the third light selective film 539 which has already been described. Namely, an area of wavelength 420–450 nm of the first light (blue) (having a wavelength of 420–470 nm) emitted from the first array light source 21 is transmitted by the third light selective film 539 that is a wavelength control means. This area (wavelength 420–450 nm) is not included in the first difference area A (wavelength about 485–about 510 nm) shown in FIG. 4.

Therefore, even when the second light (blue) includes both of P polarized light and S polarized light, there is not generated a phenomenon of declined utilization efficiency of light caused by averaging P polarized light and S polarized light of the first light (blue).

In this case, when the first light (blue) (having a wavelength of 420–470 nm) emitted from the first array light source 21 is transmitted through the third light selective film 539 representing a wavelength control means, an amount of light is slightly lowered. However, a decline of utilization efficiency of light can be prevented on the whole, because sensitivity of photographic paper 10 for the first light (blue) is excellent as mentioned earlier.

Incidentally, as is clear from FIG. 4, point α where the transmittance of the first light selective film 35 for S polarized light falls suddenly is present on the left side of the first difference area A (wavelength about 485–about 510 nm). In the present embodiment, the wavelength corresponding to this point α is about 470 nm. When the wavelength corresponding to this point a is included in the wavelength area of the first light (blue) entering the first light selective film 35, transmission of the first light (blue) through the first light selective film 35 is declined suddenly, and there is a fear that the efficiency of utilization of light is lowered than is expected.

However, in the present embodiment, light for the wavelength area of 420–450 nm in the first light (blue) (having a wavelength of 420–470 nm) emitted from the first array light source 21 is transmitted through the third light selective film 539 representing a wavelength control means. Therefore, the wavelength (about 470 nm) corresponding to point α is not included in the wavelength area of the first light (blue) entering the first light selective film 35, thus, there is no fear that the efficiency of utilization of light is lowered than is expected.

Incidentally, the third light selective film 539 representing a wavelength control means has an interface with air, and therefore, adjustment of a thickness and layer structure are free, which offers an advantageous point that control of a wavelength can be easily conducted.

Incidentally, as shown in FIG. 4, there is a difference between a wavelength (about 590 nm) in the case of switching of P polarized light from reflection to transmission by the first light selective film 35 and a wavelength (about 635 nm) in the case of switching of S polarized light from reflection to transmission by the first light selective film 35. Let it be assumed that this difference area of the wavelengths (about 590 nm–about 635 nm in wavelength) is called "second difference area B" hereafter. In this case, the wavelength in the case of switching of P polarized light (S polarized light) from reflection to transmission by the first light selective film 35 means a wavelength at a point in time when the transmittance of the first light selective film 35 reaches 50% after going up slowly from 0%.

In this case, a wavelength of the third light (red) is set to be 640–680 nm by the third array light source 23, and this wavelength area (640–680 nm) is not included in the second difference area B (wavelength of about 590–about 635 nm). Therefore, even when the third light (red) includes both P polarized light and S polarized light. Therefore, even when the second light (blue) includes both of P polarized light and S polarized light, there is not generated a phenomenon of declined utilization efficiency of light caused by averaging P polarized light and S polarized light of the third light (red).

Further, a wavelength of the third light (green) is set to be 530–580 nm by the third array light source 23, and this wavelength area (530–580 nm) is not included in the first difference area A and second difference area B. Therefore, even when the third light (green) includes both P polarized light and S polarized light, there is not generated a phenomenon of declined utilization efficiency of light caused by averaging P polarized light and S polarized light of the third light (green).

Incidentally, when jointing sides of respective transparent members and when jointing sheet-formed glass member 538 with the first transparent member 31, it is possible to use adhesive agents. As a type of the adhesive agent, acrylic resin (acrylic UV curing resin, in particular) can be given.

When providing the second light selective film 38, a prescribed metal film is first provided through deposition on side 33b of the third transparent member 33 or on side 31c of the first transparent member 31. Then, side 33b of the third transparent member 33 and side 31c of the first transparent member 31 are jointed each other by adhesive agents.

When providing the first light selective film 35, a prescribed metal film is first provided through deposition on other side 31b of the first transparent member 31 or on side 32b of the second transparent member 32. Then, other side 31b of the first transparent member 31 and side 32b of the second transparent member 32 are jointed each other by adhesive agents.

On the image exposure apparatus in the present embodiment, there is provided a wavelength control means (third light selective film 539) which makes a wavelength area of the first light (blue) not to be included in the difference area (first difference area A) between the wavelength in the case of switching of P polarized light from transmission to reflection by the first light selective film 35 and the wavelength in the case of switching of S polarized light from transmission to reflection. Therefore, even when the first light (blue) includes both P polarized light and S polarized light, efficiency of utilization of light is not lowered.

Further, the third light selective film 539 provided to be exposed on the surface of the first transparent member 31 is employed on the image exposure apparatus in the present embodiment, as a wavelength control means to make the first light (blue) to enter. Since this third light selective film 539 has an interface with air, a thickness of the film can be adjusted freely. Therefore, even when the first difference area A is varied by the layer structure of the first light selective film 35, it is possible to obtain the optimum film structure conforming to the variation. As a result, a wavelength can be controlled extremely accurately.

When the first difference area A is broadened to a wavelength of about 440–510 nm and a portion overlapped with a wavelength area of the first light (blue) is broad accordingly, it is possible to control a wavelength by making the film of the third light selective film 539 to be thick, but, the efficiency of utilization of light is sometimes lowered. In this case, it is possible to make the wavelength area of the first light (blue) to correspond to the inside of the broadened first difference area A, without providing the third light selective film 539, on the contrary. Even in this case, an influence of the lowered efficiency of utilization of light is small, because sensitivity of photographic paper 10 for the first light (blue) is high.

(Third Embodiment)

Next, the third embodiment will be explained, referring to FIG. 11.

Only elements in the third embodiment which are different from those in the first embodiment will be explained, and an explanation of the same constructions as those in the first embodiment will be omitted.

Figure 11:
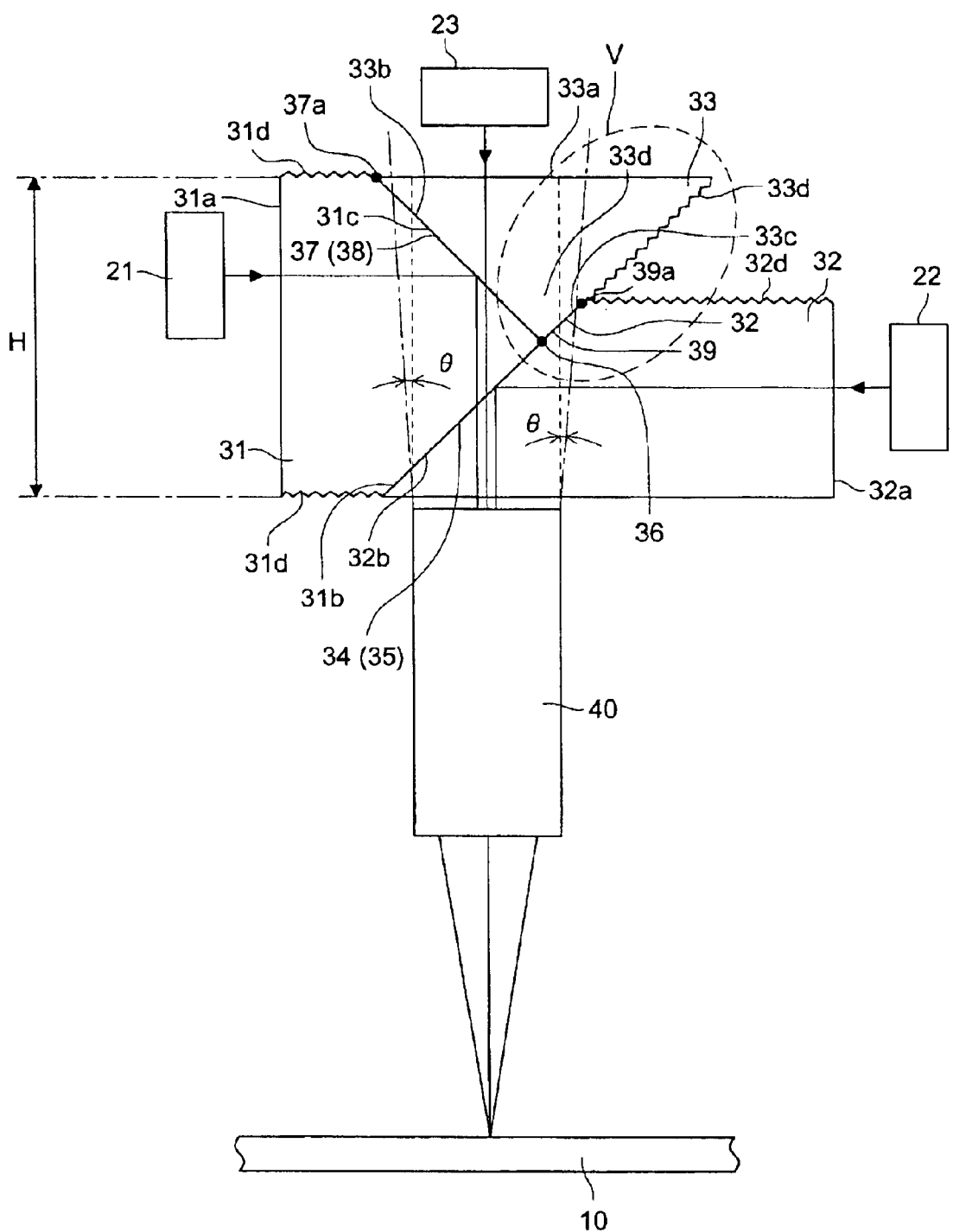
FIG. 11 is a sectional view showing the concrete structure of a dichroic prism of an image exposure apparatus relating to the third embodiment of the invention.

As shown in FIG. 11, the third embodiment is composed of sides respectively of the lengthy column-shaped first, second and third transparent members which are jointed each other, and in a light-mixing device that mixes rays of light each having a different wavelength emitted respectively from the first, second and third light-emitting element rows and forms linear emergent rays of light, the second light selective film that transmits or reflects light selectively depending on a wavelength is provided on the second composition plane formed by a side of the aforesaid first transparent member and by a side of the aforesaid third transparent member both jointed each other, the first light selective film that transmits or reflects light selectively depending on a wavelength is provided on the first composition plane formed by another side of the aforesaid first transparent member and by a side of the aforesaid second transparent member both jointed each other, and the first transparent member has a plane of incidence where the first light emitted from the first light-emitting element row enters, the second transparent member has a plane of incidence where the second light emitted from the second light-emitting element row enters, and the third transparent member has a plane of incidence where the third light emitted from the third light-emitting element row enters, and surfaces other than specific surfaces of the following first—third transparent members are formed to be non-polished surfaces.

For example, non-polished surface 33d is provided on each of surfaces other than the plane of incidence and a side on which the second light selective film is provided, in the third transparent member, or non-polished surface 31d is provided on each of surfaces other than the plane of incidence, a side on which the second light selective film is provided and other side where the first light selective film is provided in the first transparent member, or non-polished surface 32d is provided on each of surfaces other than the plane of incidence and a side where the first light selective film is provided, in the second transparent member. Further, all surfaces other than specific surfaces of the first—third transparent members may also be formed to be non-polished surfaces.

In the aforesaid structure, non-polished surface 33d is provided on each of surfaces other than the plane of incidence and a side where the second light selective film is provided, in the third transparent member. Further, non-polished surface 31d is provided on each of surfaces other than the plane of incidence, a side on which the second light selective film is provided and other side where the first light selective film is provided, in the first transparent member. In addition, non-polished surface 32d is provided on each of surfaces other than the plane of incidence and a side on which the first light selective film is provided, in the second transparent member.

Namely, labor and expenses required for polishing processing can be reduced sharply, because non-polished surfaces are provided on each transparent member.

In the examples stated above, "bending stress" and "torsional stress" which are loaded on the transparent member in the course of polishing processing can be reduced to the necessary minimum, because non-polished surfaces are provided on each transparent member. Accordingly, "a warp" generated in the longitudinal direction of the transparent member can be reduced. As a result, the rate of contact between "warped" portions of the transparent members becomes small, and therefore, bubbles generated between the transparent members and "a warp" caused on the total product can be reduced, resulting in higher quality of products.

Further, in the examples stated above, non-polished surfaces can be held by fingers when polishing processing is conducted on the side that serves as a path for light emitted from each light-emitting element row, in each transparent member. It is therefore possible to prevent that the surface to be polished is touched by fingers, which also results in higher quality of products.

The following effects can be obtained by the invention.

(1) An area of the third composition plane representing one other than the composition planes (first and second composition planes) on each of which a light selective film is provided can be made to be relatively small, and therefore, it is possible to make an area of the total composition planes to be small. Therefore, the rate of contact between "warped" portions of the transparent members can be reduced, which results in higher quality of products.

(2) Other side of the first transparent member and a side of the second transparent member form a concave portion into which a corner portion of the third transparent member is fitted. Then, under the condition that a corner portion of the third transparent member is fitted in the concave portion, the second composition plane can be formed by jointing other side of the first transparent member and a side of the second transparent member with each other. Further, the third composition plane can be formed by jointing a side of the second transparent member and other side of the third transparent member with each other. Therefore, light-mixing devices can be manufactured extremely easily.

(3) An area of the portion in other side of the third transparent member where the third composition plane is formed is made to be less than ½ of the total area of other sides of the third transparent member, and an area of the third composition plane representing a composition plane other than the composition planes (first and second composition planes) on each of which a light selective film is provided is made to be relatively small. Therefore, an area of the total composition planes is made to be small, and the rate of contact between "warped" portions of the transparent members is reduced, which results in higher quality of products.

(4) When a light-converging means is provided in the direction in which the mixed light emerges, it is possible to prevent that scattered light generated when the first light is reflected by the second light selective film and scattered light generated when the second light is reflected by the first light selective film enter the light-converging means. Therefore, images with higher quality can be obtained.

(5) There is provided a wavelength control means that makes a wavelength area of the first light not to be included in a difference area between a wavelength in the case of switching of P polarized light from transmission to reflection and a wavelength in the case of switching of S polarized light from transmission to reflection in the first light selective film. Therefore, even when the first light includes both P polarized light and S polarized light, the efficiency of utilization of light is not lowered.

(6) The wavelength control means is the third light selective film that is provided to be exposed on the surface of the first transparent member so that the first light may enter, and this third light selective film has an interface with air, therefore, a thickness of the film can be adjusted freely. Therefore, even when a difference area between a wavelength of P polarized light in the case of switching from transmission to reflection and a wavelength of S polarized light in the case of switching from transmission to reflection in the first light selective film is varied by the layer structure of the first light selective film, it is possible to obtain the optimum film structure conforming to the variation. As a result, a wavelength can be controlled extremely accurately.

(7) It is possible to provide an image exposure apparatus equipped with a light-mixing device related to the invention.

(8) It is possible to provide an image exposure apparatus employing a light-mixing device related to the invention.

What is claimed is:

1. An optical device, which mixes a plurality of lights coming from directions which are different relative to each other, so as to emit a mixed light in a unilateral direction, said optical device comprising:

a first transparent member to receive a first light emitted from a first light-emitting element row;

a second transparent member to receive a second light emitted from a second light-emitting element row;

a third transparent member to receive a third light emitted from a third light-emitting element row;

a first composition plane, at which said first transparent member and said second transparent member are jointed together and a first light selective film is formed, wherein said first light selective film is adapted (i) to allow said first light and said third light to penetrate through said first light selective film and (ii) to reflect said second light toward a traveling direction which is the same as a traveling direction of said first light and said third light;

a second composition plane, at which said first transparent member and said third transparent member are jointed together and a second light selective film is formed, wherein said second light selective film is adapted (i) to allow said third light to penetrate through said second light selective film and (ii) to reflect said first light toward said traveling direction which is the same as said traveling direction of said third light; and a wavelength controlling element to exclude a wavelength region of said first light from a differential region between a wavelength at which a P-polarization changes from transmission to reflection in said first composition plane and another wavelength at which a S-polarization changes from transmission to reflection in said first composition plane; and wherein said wavelength controlling element is provided on at least one of said first transparent member, said second transparent member and said third transparent member in an exposed state, and comprises a third light selective film through which at least one of said first light, said second light, said third light and said mixed light penetrates in a wavelength selective manner.

2. The optical device of claim 1, wherein said first light comprises blue light, said second light comprises green light and said third light comprises red light.

3. An optical device, which mixes a plurality of lights coming from directions which are different relative to each other, so as to emit a mixed light in a unilateral direction, said optical device comprising:

a first transparent member to receive a first light emitted from a first light-emitting element row;

a second transparent member to receive a second light emitted from a second light-emitting element row;

a third transparent member, having an angular portion, to receive a third light emitted from a third light-emitting element row;

a first composition plane, at which said first transparent member and said second transparent member are jointed together and a first light selective film is formed, wherein said first light selective film is adapted (i) to allow said first light and said third light to penetrate through said first light selective film and (ii) to reflect said second light toward a traveling direction which is the same as a traveling direction of said first light and said third light; and a second composition plane, at which said first transparent member and said third transparent member are jointed together and a second light selective film is formed, wherein said second light selective film is adapted (i) to allow said third light to penetrate through said second light selective film and (ii) to reflect said first light toward said traveling direction which is the same as said traveling direction of said third light;

wherein said angular portion of said third transparent member is fitted into a V-shaped groove, which is formed by said second composition plane and an extended plane of said first composition plane; and wherein said extended plane is flatly continued from said first composition plane.

4. The optical device of claim 3, wherein a shape of said first transparent member is a lengthy pentagonal column, a vertex portion of which is an intersection of said first composition plane and said second composition plane, and wherein a shape of said second transparent member is a lengthy trapezoidal column, in which said first composition plane and said extended plane extended constitute a continuously-sloped surface, and a shape of said third transparent member is a lengthy triangle column having said angular portion.

5. The optical device of claim 3,
wherein $S_1$, defined as a total area of side surface of said third transparent member, said side surface being jointed to said extended plane, and $S_2$ defined as an area of said extended plane of said first composition plane, fulfill the following relationship $$S_2 < (\tfrac{1}{2}) S_1.$$

6. The optical device of claim 3, wherein a first end of said second composition plane and a second end of said extended plane are disposed outside an aperture angle region of a light-conversing element equipped in a direction of emitting said mixed light, and both said first end and said second end are located at positions other than an intersection of said first composition plane and said second composition plane.

7. The optical device of claim 3, wherein a non-polished surface is provided on said third transparent member, and said non-polished surface is located at a surface other than a light-receiving surface which receives said third light and a surface of said second composition plane.

8. The optical device of claim 3, wherein a non-polished surface is provided on said first transparent member, and said non-polished surface is located at a surface other than a light-receiving surface which receives said first light and a surface of said first composition plane.

9. The optical device of claim 3, wherein a non-polished surface is provided on said second transparent member, and said non-polished surface is located at a surface other than a light-receiving surface which receives said second light and a surface of said second composition plane.

10. An apparatus for exposing an image onto a photosensitive material, said apparatus comprising:
a first light-emitting element row to emit a first light;
a second light-emitting element row to emit a second light in a direction of emission different from a direction of emission of said first light;
a third light-emitting element row to emit a third light in a direction different from the directions of emission of said first light and said second light;
an optical device to mix said first light, said second light and said third light, so as to emit a mixed light in a unilateral direction, and to distribute said mixed light on a line to expose said photosensitive material; and
a moving device to move one of said photosensitive material and said optical device in a direction substantially orthogonal to said line of said mixed light;
wherein, said optical device comprises:
a first transparent member to receive said first light;
a second transparent member to receive said second light;
a third transparent member, having an angular portion, to receive said third light;
a first composition plane, at which said first transparent member and said second transparent member are jointed together and a first light selective film is formed, wherein said first light selective film is adapted (i) to allow said first light and said third light to penetrate through said first light selective film and (ii) to reflect said second light toward a traveling direction which is the same as a traveling direction of said first light and said third light; and
a second composition plane, at which said first transparent member and said third transparent member are jointed together and a second light selective film is formed, wherein said second light selective film is adapted (i) to allow said third light to penetrate through said second light selective film and (ii) to reflect said first light toward said traveling direction which is the same as said traveling direction of said third light;
wherein said angular portion of said third transparent member is fitted into a V-shaped groove, which is formed by said second composition plane and an extended plane of said first composition plane; and
wherein said extended plane is flatly continued from said first composition plane.

11. The apparatus of claim 10, wherein a shape of said first transparent member is a lengthy pentagonal column, a vertex portion of which is an intersection of said first composition plane and said second composition plane, and
wherein a shape of said second transparent member is a lengthy trapezoidal column, in which said first composition plane and said extended plane constitute a continuously-sloped surface, and a shape of said third transparent member is a lengthy triangle column having said angular portion.

12. The apparatus of claim 10, wherein said first light comprises blue light, said second light comprises green light and said third light comprises red light.

13. A method for exposing an image onto a photosensitive material, said method comprising:
emitting a first light, a second light and a third light, directions of which are different relative to each other, toward an optical device;
mixing said first light, said second light and said third light, all entering said optical device, with each other in said optical device;
exposing a mixed light onto said photosensitive material, said mixed light being distributed on a line; and
moving one of said photosensitive material and said optical device in a direction substantially orthogonal to said line of said mixed light;
wherein said optical device comprises:
a first transparent member to receive said first light;
a second transparent member to receive said second light;
a third transparent member, having an angular portion, to receive said third light;
a first composition plane, at which said first transparent member and said second transparent member are jointed together and a first light selective film is formed, wherein said first light selective film is adapted (i) to allow said first light and said third light to penetrate through said first light selective film and (ii) to reflect said second light toward a traveling direction which is the same as a traveling direction of said first light and said third light; and
a second composition plane, at which said first transparent member and said third transparent member are jointed together and a second light selective film is formed, wherein said second light selective film is adapted (i) to allow said third light to penetrate through said second light selective film and (ii) to reflect said first light toward said traveling direction which is the same as said traveling direction of said third light;

wherein said angular portion of said third transparent member is fitted into a V-shaped groove, which is formed by said second composition plane and an extended plane of said first composition plane; and wherein said extended plane is flatly continued from said first composition plane.

* * * * *